US00RE35700E

United States Patent [19]

Watson et al.

[11] E Patent Number: Re. 35,700

[45] Reissued Date of Patent: Dec. 30, 1997

[54] REMOVABLE SNOWPLOW ASSEMBLY WITH PIVOTABLE LIFT STAND

[75] Inventors: Gary E. Watson; James R. Doornek, both of Mequon; Thomas P. Fechter, Jackson, all of Wis.

[73] Assignee: Douglas Dynamics, L.L.C., Milwaukee, Wis.

[21] Appl. No.: 566,277

[22] Filed: Dec. 1, 1995

Related U.S. Patent Documents

Reissue of:

[64] Patent No.: 5,125,174
Issued: Jun. 30, 1992
Appl. No.: 686,123
Filed: Apr. 15, 1991

U.S. Applications:

[63] Continuation of Ser. No. 268,195, Jun. 29, 1994, abandoned.

[51] Int. Cl.[6] ..... E01H 5/04

[52] U.S. Cl. ..... 37/231; 37/235; 37/270

[58] Field of Search ..... 37/231, 232, 233, 37/234, 235, 236, 266, 270, 271

[56] References Cited

U.S. PATENT DOCUMENTS

| | | | |
|---|---|---|---|
| 1,786,974 | 12/1930 | Abbe | 37/270 X |
| 2,144,312 | 1/1939 | Klauer . | |
| 2,426,410 | 8/1947 | Owen . | |
| 2,430,221 | 11/1947 | Frink et al. . | |
| 2,710,464 | 6/1955 | Husting . | |
| 2,722,066 | 11/1955 | Wills et al. . | |
| 2,740,213 | 4/1956 | Barrett . | |
| 2,792,650 | 5/1957 | Kenyon . | |
| 2,884,720 | 5/1959 | Meyer et al. | 37/270 X |
| 2,979,839 | 4/1961 | Hugger . | |
| 3,020,066 | 2/1962 | Torrey . | |
| 3,142,197 | 7/1964 | Tourneau . | |
| 3,145,781 | 8/1964 | Rogler | 172/276 |
| 3,160,965 | 12/1964 | Walker et al. | 37/232 |
| 3,161,072 | 12/1964 | Tourneau . | |
| 3,201,878 | 8/1965 | Markwardt . | |
| 3,217,431 | 11/1965 | Heinzroth et al. | 37/270 |
| 3,412,489 | 11/1968 | Klapprodt et al. . | |
| 3,432,946 | 3/1969 | Peitl . | |
| 3,432,947 | 3/1969 | Peitl . | |
| 3,432,949 | 3/1969 | Glesmann . | |
| 3,433,168 | 3/1969 | Banker . | |
| 3,464,129 | 9/1969 | Bogenschutz . | |
| 3,465,456 | 9/1969 | Meyer . | |
| 3,466,766 | 9/1969 | Kahlbacher | 37/233 |
| 3,483,641 | 12/1969 | Hirt . | |

(List continued on next page.)

FOREIGN PATENT DOCUMENTS

| | | |
|---|---|---|
| 128695 | 7/1947 | Sweden . |
| 129907 | 7/1947 | Sweden . |
| 471288 | 5/1969 | Sweden . |

OTHER PUBLICATIONS

Diamond Snow Plows; publication date unknown.

Fisher Snow Plows; copyright 1989, Fisher Engineering.

Good Roads Champion Snow Removal Ice and Sleet Control Equipment, 1940.

*Primary Examiner*—Terry Lee Melius
*Assistant Examiner*—Victor Batson
*Attorney, Agent, or Firm*—Michael, Best & Friedrich

[57] ABSTRACT

A detachable snowplow blade lift assembly including a [mount] *mounting* frame permanently connected to the vehicle frame. A snowplow assembly including an A-frame and a snowplow blade mounted on the A-frame is pivotally connected to the [mount] *mounting* frame. A lift frame assembly including a lift actuator mechanism for raising and lowering the A-frame and snowplow blade is pivotally connected to the A-frame for rotation about a pivot axis. The snowplow blade lift assembly also includes a mounting arrangement for releasably connecting the A-frame and lift frame as a unit to the vehicle for pivotable movement of the A-frame relative to the vehicle and to the lift frame about the pivot axis. The A-frame mount affording pivotal movement of the A-frame and the lift frame about a common pivot axis provides a snowplow blade lift assembly which can be attached to, and detached from, the mounting frame as a unit and which has the capacity to stack snow.

56 Claims, 6 Drawing Sheets

U.S. PATENT DOCUMENTS

| | | | |
|---|---|---|---|
| 3,545,109 | 12/1970 | Boschung | 37/233 |
| 3,552,659 | 1/1971 | Meyer . | |
| 3,587,182 | 6/1971 | Hirt | 37/270 X |
| 3,587,750 | 6/1971 | Cantral . | |
| 3,588,147 | 6/1971 | Enters . | |
| 3,604,454 | 9/1971 | Tomke et al. . | |
| 3,605,906 | 9/1971 | Coates . | |
| 3,640,005 | 2/1972 | Chiarolanza et al. . | |
| 3,650,054 | 3/1972 | Hanson . | |
| 3,706,144 | 12/1972 | Miceli . | |
| 3,720,010 | 3/1973 | Coates . | |
| 3,746,368 | 7/1973 | Gledhill et al. . | |
| 3,773,074 | 11/1973 | Miceli . | |
| 3,793,752 | 2/1974 | Snyder . | |
| 3,800,882 | 4/1974 | Werts et al. . | |
| 3,845,577 | 11/1974 | Naymik | 37/270 X |
| 3,851,894 | 12/1974 | St. Pierre | 37/231 X |
| 3,876,092 | 4/1975 | MacDonald . | |
| 3,952,431 | 4/1976 | Gledhill et al. . | |
| 3,987,562 | 10/1976 | Deen et al. | 37/232 X |
| 4,065,009 | 12/1977 | Old . | |
| 4,089,171 | 5/1978 | Hubbard . | |
| 4,215,496 | 8/1980 | Wehr | 37/232 X |
| 4,236,329 | 12/1980 | Hetrick | 37/231 |
| 4,238,895 | 12/1980 | Hetrick | 37/41 |
| 4,244,122 | 1/1981 | Hetrick | 37/41 |
| 4,279,084 | 7/1981 | Low et al. | 37/42 R |
| 4,307,523 | 12/1981 | Reissinger et al. | 37/232 X |
| 4,342,163 | 8/1982 | Hoekstra | 37/231 |
| 4,528,762 | 7/1985 | Sarka et al. | 37/236 |
| 4,821,435 | 4/1989 | Pester | 37/231 |
| 4,962,598 | 10/1990 | Woolhiser et al. | 37/236 X |
| 4,976,053 | 12/1990 | Caley | 37/231 |
| 4,991,323 | 2/1991 | Benkler | 37/231 X |
| 5,075,988 | 12/1991 | Ciula | 37/234 X |
| 5,121,562 | 6/1992 | Feller | 37/270 X |

REMOVABLE SNOWPLOW ASSEMBLY WITH PIVOTABLE LIFT STAND

Matter enclosed in heavy brackets [ ] appears in the original patent but forms no part of this reissue specification; matter printed in italics indicates the additions made by reissue.

*This is a continuation of application Ser. No. 08/268,195, filed Jun. 29, 1994, now abandoned.*

BACKGROUND OF THE INVENTION

1. Technical Field

The invention relates generally to snowplow blade lift assemblies for mounting on a vehicle, and more particularly to snowplow blade lift assemblies which are releasably mounted on the vehicle.

2. Relation to Prior Art

It is often desirable to provide a snowplow blade lift assembly with a mechanism affording the attachment and detachment of the snowplow blade lift assembly to the vehicle. The vehicle owner may wish to remove the snowplow blade, for example, during times when the need for plowing snow arises infrequently or when the vehicle is used for purposes other than for plowing snow.

Conventional detachable snowplow blade lift assemblies often provide a mounting frame permanently attached to the frame of the vehicle, a plow blade attached to an A-frame which, in turn, can be releasably connected to the mounting frame, and a lift mechanism for the A-frame. The mounting frame of various such snowplow blade lift assemblies is located on the front end of the vehicle generally behind the vehicle's bumper. The A-frame with the attached plow is generally removable from the vehicle, but most commonly the lift mechanism, usually a relatively heavy hydraulic lift unit, remains on the vehicle. Leaving the hydraulic lift unit on the vehicle, when the remainder of the plow assembly is removed, extends exposure of the lift unit to the elements and to possible damage. In addition, the permanently mounted, relatively heavy lift unit places the front of the vehicle under additional loading and can reduce the operational life of the suspension of the vehicle. Also, leaving the relatively heavy hydraulic unit on the vehicle can reduce the fuel efficiency of the vehicle.

There has been proposed assemblies wherein the hydraulic lift unit can be removed from the vehicle upon detachment of the plow and wherein the positions of the plow assembly or support therefore remaining on the vehicle are located substantially behind the bumper. Examples of such detachable snowplow blade lift assemblies are illustrated in U.S. Pat. No. 4,279,084 which issued to Low et al. on Jul. 21, 1981; and U.S. Pat. No. 4,439,939 which issued to Blau on Apr. 3, 1984. These prior proposals, however, have been relatively complicated and/or required numerous assembly and disassembly steps and involved numerous separate parts.

Also, when plowing snow, it is sometimes desirable to push the plowed snow into a pile and to "stack" snow on top of the pile or into a bank of snow. In order to stack snow, the A-frame of the snowplow assembly must be free to pivot upwardly relative to the vehicle so that the snowplow blade attached to the A-frame can rise up the slope of the snow bank. A problem with prior conventional detachable snowplow blade lift assemblies is that the mounting frames and components supported thereby are located in a position which interferes with the free upward movement of the A-frame, thereby diminishing the capacity of the snowplow blade lift assembly to stack snow.

Another problem associated with known snowplow blade lift assemblies is that the attachment and detachment of the assembly to the vehicle can require lifting of the A-frame and the connection of various elements of the snowplow blade lift assembly to a mounting frame. Such lifting, attachment and detachment of the snowplow lift assembly can be cumbersome and difficult.

Accordingly, it is an object of the present invention to provide a detachable snowplow blade assembly, plow, A-frame and lift assembly, which can be attached and detached from the front of a vehicle as a single unit.

It is another object of the present invention to provide a snowplow blade lift assembly that does not require a relatively heavy mounting frame to be permanently attached to the vehicle.

It is another object of the invention to provide a snowplow blade lift assembly which can be attached and detached from a vehicle without cumbersome manual lifting of the A-frame.

A more specific object of this invention is to provide a detachable plow, A-frame and lift assembly which, when detached, removes virtually all structural elements forward of the vehicle's bumper.

It is another object of the invention to provide a snowplow blade lift assembly having the above desirable characteristics and as well as the capacity to stack snow.

SUMMARY OF THE INVENTION

For the achievement of these and other objects, the present invention provides a detachable snowplow blade lift assembly including a mount frame permanently connected to the vehicle frame. A snowplow assembly including an A-frame and a snowplow blade mounted on the A-frame is connected to the mount frame for pivotal movement about a pivot axis. A lift frame assembly is pivotally connected to the A-frame for pivotal movement about the pivot axis and includes, as a part thereof, a lift actuator mechanism for raising and lowering the A-frame and snowplow. The snowplow blade lift assembly also includes mounting means for releasably connecting the A-frame and the lift frame as a unit to the vehicle for pivotable relative movement about the pivot axis between the A-frame and the vehicle and the lift frame. Provision of an A-frame mount affording pivotal movement of the A-frame and the lift frame about a common pivot axis allows the snowplow blade lift assembly to be attached to, and detached from, the mounting frame as a unit and also allows the A-frame and plow blade to pivot relative to lift frame assembly during the plowing of snow.

More particularly, the mount frame is located generally behind the bumper. The mount frame has a substantially unitary construction and is adapted to be releasably connected to the forwardly extending A-frame. The mount frame transfers loads resulting from the lifting and lowering of the snowplow assembly and *resulting* from the plowing and stacking of snow from the A-frame and from the lift frame to the vehicle frame. The snowplow assembly includes mounting means for pivotally connecting the A-frame to the mount frame so that the A-frame and the associated snowplow blade can be pivoted *relative to the mount frame* about a generally horizontally extending pivot axis. The lift frame is pivotally connected to the A-frame in a manner so that the lift frame is pivotable relative to the A-frame about a horizontally extending pivot axis which is coaxial with the A-frame pivot axis. The lift frame is also selectively connectable to the mount frame on the vehicle so that the lift frame can be secured to the vehicle when the A-frame is attached to the vehicle while remaining pivotable relative to the A-frame.

The snowplow assembly affords removal of the A-frame and the lift frame with the lift actuator from the mounting frame assembly as a unit so that, when the plow assembly and lift frame assemblies are removed, the vehicle forward of the bumper is unencumbered with apparatus extending beyond the bumper for supporting the snowplow blade. Since the lift actuator and the lift frame remain with the A-frame when the A-frame is removed from the vehicle, the lift actuator need not be disconnected from the A-frame when the A-frame is removed from the vehicle. The mounting means for attaching and detaching the snowplow blade assembly from the vehicle as a unit and the construction and arrangement of the components of the blade assembly also facilitates attachment and detachment of the snowplow blade assembly and facilitates storage of the snowplow assembly as a unit.

The snowplow blade lift assembly also provides an A-frame mount design having the capacity to stack snow. The lift frame is pivotable relative to the A-frame and supports the lift actuator mechanism in an elevated position which affords a range of free upward movement of the A-frame necessary for the stacking of snow. While the lift frame remains pivotable relative to the A-frame, the lift frame, during plowing, is fixed to the vehicle so that lights and other accessories which may be mounted on the lift frame remain fixed relative to the vehicle during plowing and during stacking of snow.

The A-frame also includes a support stand for supporting the A-frame in a generally horizontal position when the A-frame is detached from the vehicle, or is in the "blade-off" position. The support stand also can be used to adjust the height of the A-frame when mounting the snowplow assembly on the mount frame. More particularly, the support stand is pivotally connected to the A-frame for rotation between a generally horizontal "blade-on" storage position and a vertical "blade-off" support position. The support stand can be connected to the lift frame which can be used as a lever to adjust the vertical position of the A-frame with respect to the mounting frame. The support stand also includes an arrangement for selectively preventing and affording rotation of the lift stand so that the snow plow assembly can be safely stored without tipping. The provision of a snowplow blade assembly having a support stand which can be selectively pivotally rotated to support the A-frame and having a mechanism to adjust the height of the snowplow assembly affords relatively simple attachment and detachment of the snowplow assembly without manual lifting of the A-frame.

Thus, it is a principal feature of the present invention to provide a snowplow blade support and lift that can be removed from the vehicle as a unit leaving the forward end of the vehicle free of structure forward of the vehicle's bumper.

It is another principal feature of the present invention to provide a snowplow blade assembly that can be attached and detached to the vehicle in a simple manner without cumbersome [manually] *manual* lifting *of* the snowplow blade assembly.

It is another principal feature of the present invention to provide a snowplow blade assembly having the capacity to stack snow and providing a lift stand which, during plowing, is fixed to the vehicle.

Various other features and advantages of the invention will become apparent to those skilled in the art upon review of the following detailed description, claims and drawings.

Figure 1:
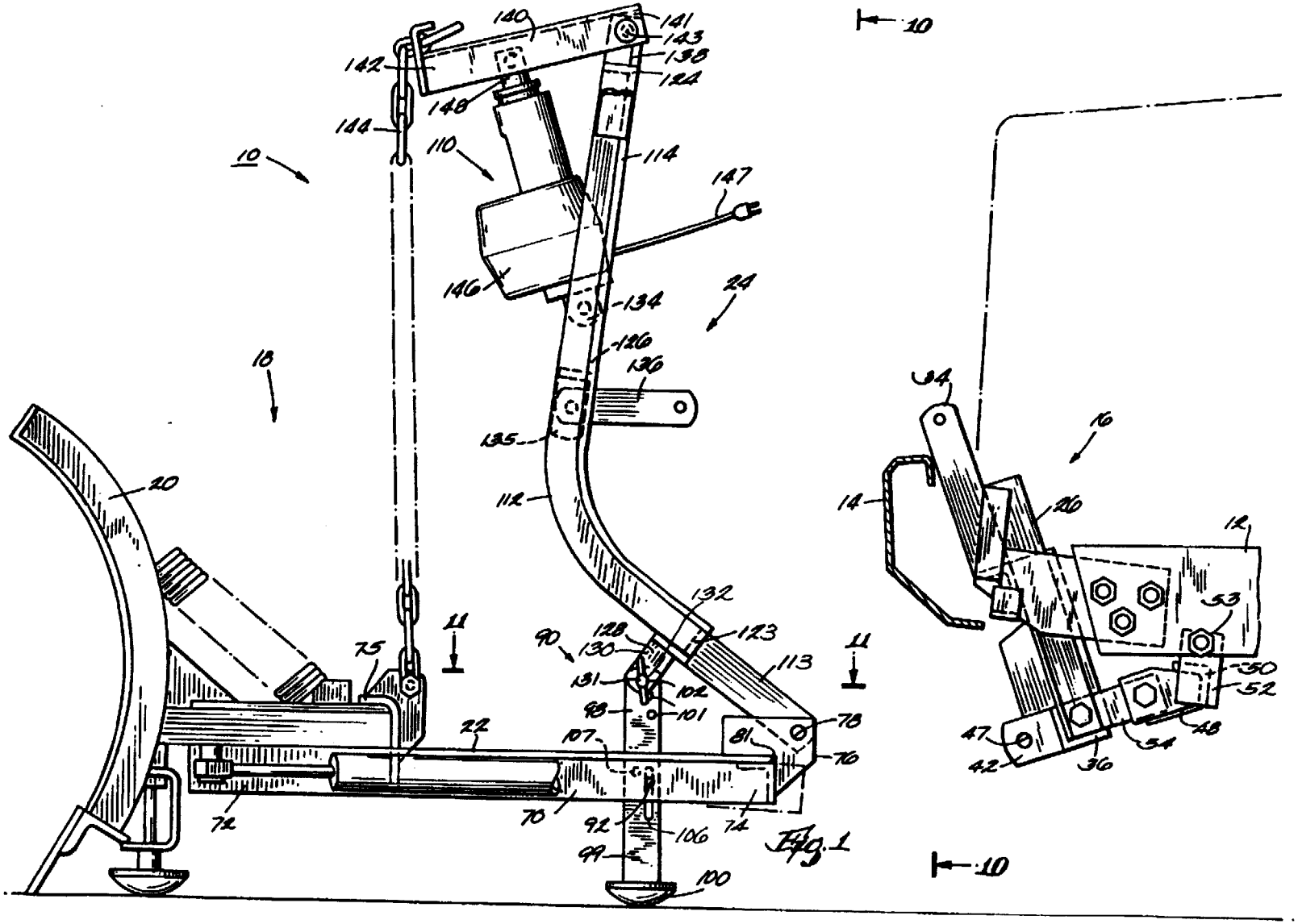
FIG. 1 is a side elevational view of a first alternative embodiment of a detachable snowplow blade lift assembly embodying the invention and in the "blade-off" position.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Illustrated in the drawings is a detachable snowplow blade lift assembly 10 embodying the invention. The assembly 10 is adapted to be mounted on the front of a vehicle, such as a pick-up truck, having a conventional frame. In the embodiment of the [invention] *snowplow blade lift assembly 10* shown in [FIG. 1] *FIGS. 1–5, 10 and 11*, the vehicle frame includes *a pair of* side members 12 (*only one shown*) and a bumper 14 located at the front end of the vehicle and supported in front of the side members 12.

The detachable snowplow blade lift assembly 10 includes a mounting frame assembly 16 which is preferably permanently fixed to the vehicle. A snowplow assembly 18 including a snowplow blade 20 is connectable to the mounting frame assembly 16 through an A-frame 22 which extends forwardly from the vehicle. A lift frame assembly 24 is pivotally connected to the A-frame 22 and is releasably connectable to the mounting frame assembly 16.

In general, mounting frame assembly 16 comprises a unitary structure fixed to the frame of the vehicle and located behind bumper 14. Mounting frame assembly 16 is connected to the A-frame 22 and *to* the lift frame assembly 24 [to transfer] *for transferring* the loads created by carrying the snow plow assembly 18, by lifting and lowering plow blade 20, and by plowing and stacking snow from the A-frame 22 and lift frame assembly 24 to the vehicle frame.

More particularly, in the first alternative embodiment shown in FIGS. 1–5, the mounting frame assembly 16 includes a laterally extending mount frame 26 *that is* connected *at multiple points* to the vehicle frame. *The vehicle frame supports the mounting frame assembly 16 such that*

*the mounting frame assembly 16 is suspended in substantial part below the vehicle frame* and *is* located *immediately* behind bumper 14. Mount frame 26 includes (FIGS. 3, 4) an upper box section 28 extending laterally between *the* side members 12 (*not shown in FIGS. 3 and 4*) and a pair of laterally spaced-apart mount frame legs 30 which are fixed at their upper ends to the opposite ends 31 of box section 28 and which extend downwardly. The mount frame 26 also includes, on each of the opposite ends 31 of box section 28, mounting plates 32 which are adapted to be fixed in a conventional manner to side members 12 *at a first point of connection*. The mount frame 26 also includes a centrally located mount frame clevis 34 *which is* fixed to the box section 28 and [extending] *which extends* therefrom generally upwardly and forwardly [over]. *As shown in FIG. 1, the clevis 34 has a distal end located adjacent the upper surface of the* bumper 14. The box section 28 transfers loads applied to the mount frame clevis 34 to the side members 12 which can result in torsional stresses on the box section 28. Accordingly, the construction of box section 28 should be designed to accommodate these torsional stresses.

Figure 2:
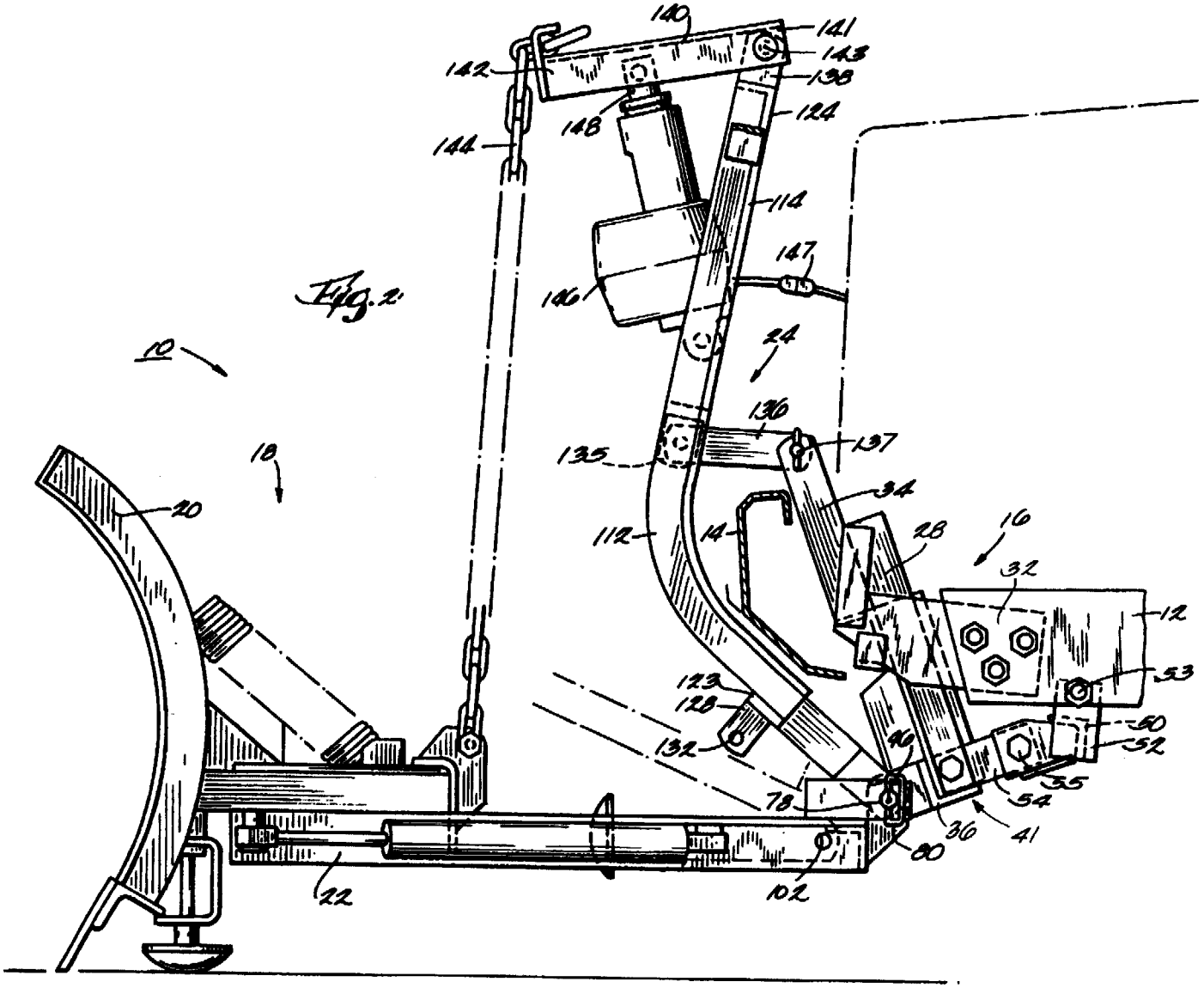
FIG. 2 is a side elevational view of the assembly shown in FIG. 1 and in the "blade-on" position.
Figure 3:
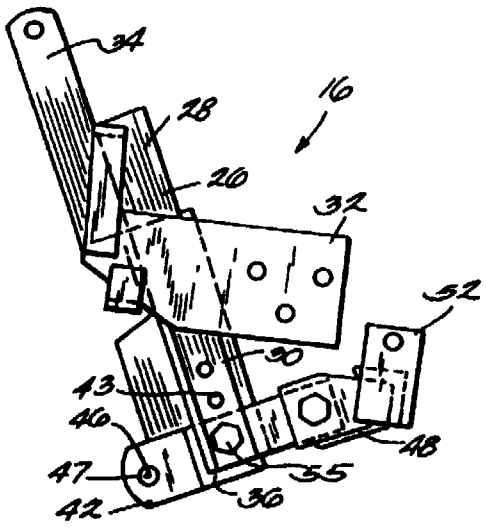
FIG. 3 is a side view of a portion of the assembly illustrated in FIG. 1.
Figure 4:
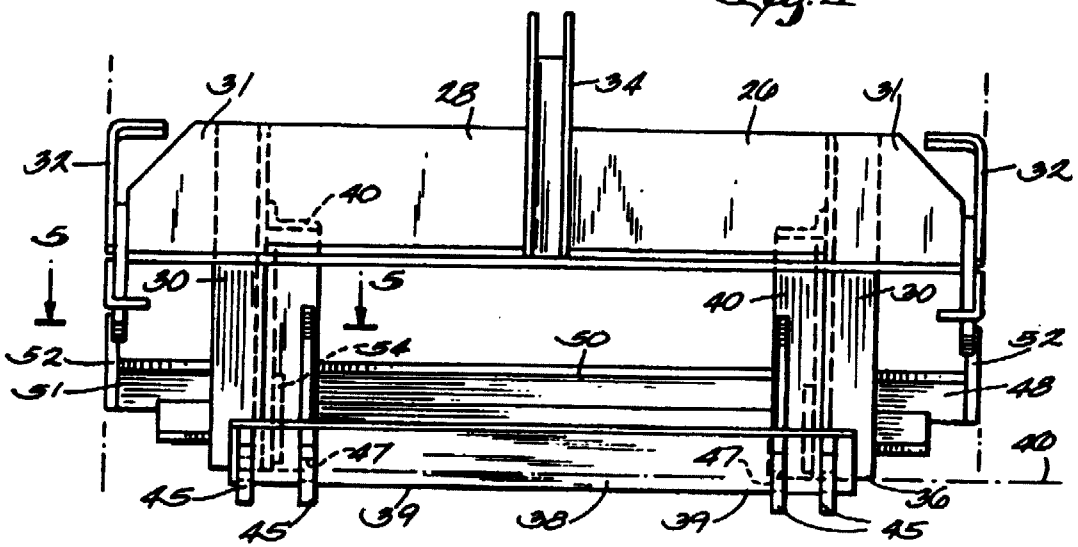
FIG. 4 is a front view of the portion illustrated in FIG. 3.

The mounting frame assembly 16 also includes (*FIGS. 3–5*) a spreader element 36 which is located below and behind bumper 14 and which is fixed to the mount frame 26. The spreader element 36 includes a laterally extending spreader bar 38 having opposite ends 39. The spreader element 36 also includes a pair of spreader legs 40 which extend upwardly from respective opposite ends 39 of the spreader bar 38. The spreader legs 40 are (FIG. 5) fixed by fasteners to the lower ends of the mount frame legs 30 to form with the mount frame 26 (FIG. 4), a generally rectangular, rigid unit *41* wherein the spreader bar 38 and box section 28 form the long, horizontal sides of the unit and the spreader legs 40 and mount frame legs 30 form the short, vertical sides of the unit. *As best shown in FIG. 2, the unit 41 formed by the interconnected box section 28 and spreader element 36 is located between and, in substantial part, below the mounting plates 32 which define the first point of connection between the mounting frame assembly 16 and the vehicle.* Preferably the spreader legs 40 have (FIG. 3) a plurality of bolt holes 43 therethrough so that the vertical distance between the spreader bar 38 and the box section 28 can be adjusted to accommodate various vehicle frames.

Figure 7:
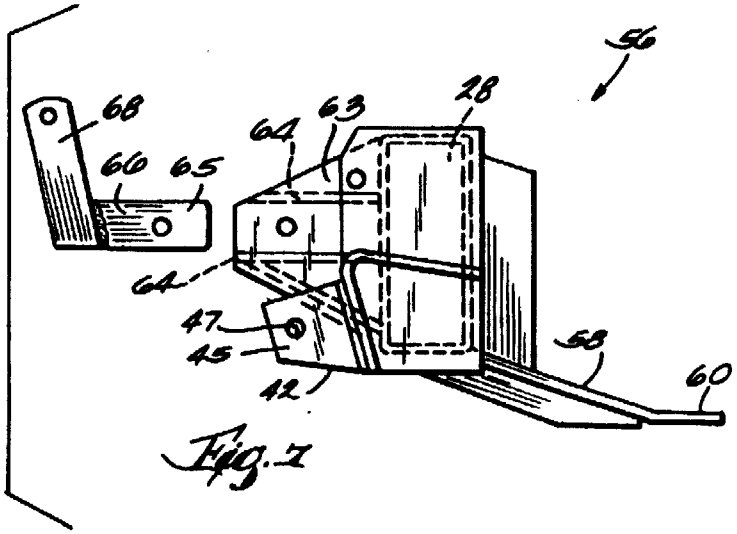
FIG. 7 is a side view of a portion of the embodiment illustrated in FIG. 6.
Figure 9:
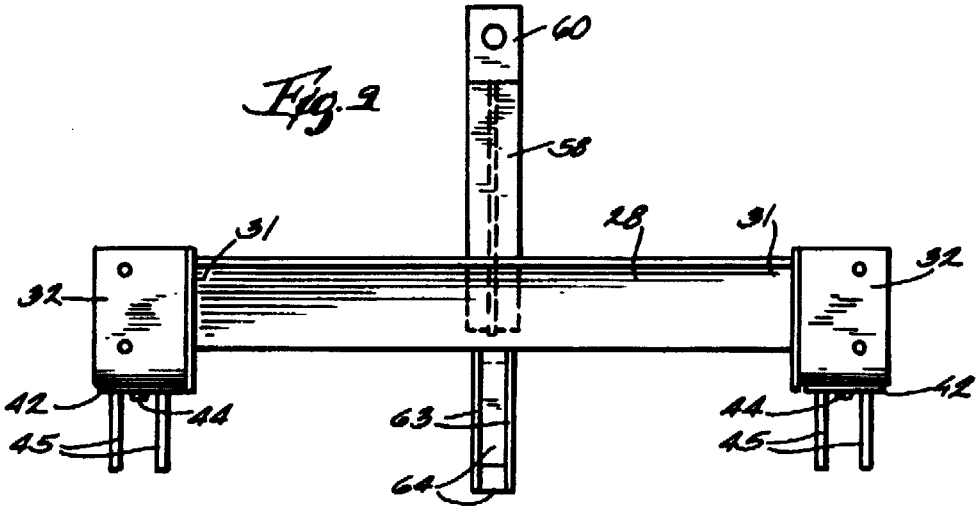
FIG. 9 is a top view of the portion illustrated in FIG. 8.
Figure 8:
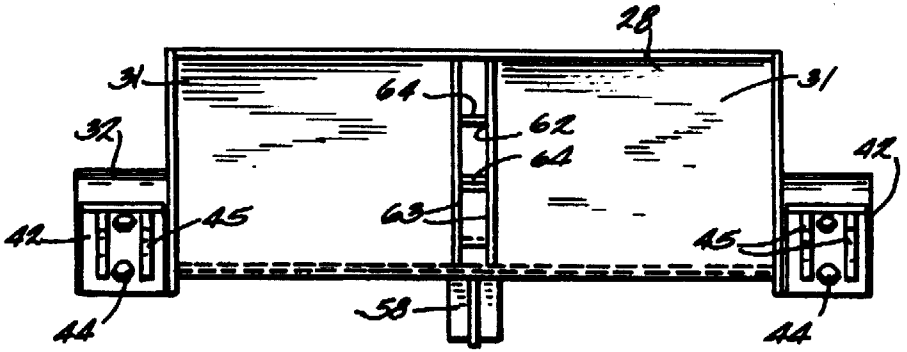
FIG. 8 is a front view of the portion illustrated in FIG. 7.

The spreader bar 38 supports on its forward surface adjacent each opposite end 39 a forwardly extending clevis or A-frame mounting lug 42. The A-frame mounting lugs 42 are fixed to the spreader bar 38 by welding or, as shown in FIGS. 7–9, by releasable fasteners 44. The mounting lugs 42 comprise a pair of spaced-apart vertical plates 45, each of which have extending therethrough a hinge pin hole 47 and are arranged on the spreader bar 38 so that the hinge pin holes 47 are coaxially aligned on a generally horizontal pivot axis 46.

Figure 5:
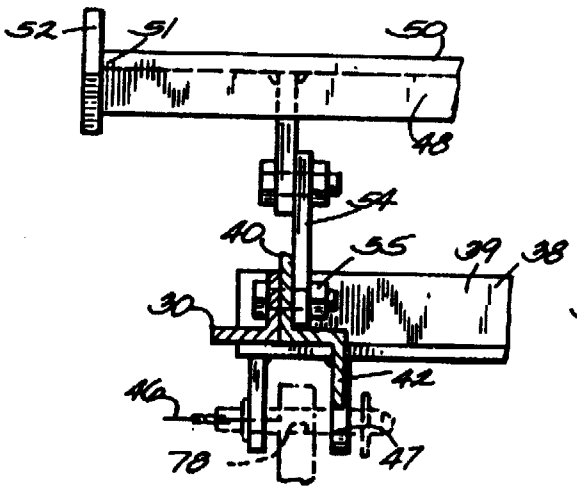
FIG. 5 is a cross-sectional view taken along line 5—5 in FIG. 4.

The mounting frame assembly 16 also includes a thrust frame 48 extending rearwardly and upwardly from the spreader element 36 to *a second point of connection with* the side members 12 of the vehicle frame. In the embodiment illustrated in FIGS. 3–5, the thrust frame 48 includes a laterally extending cross bar 50 having opposite ends 51 each of which support a mounting block 52. As shown in FIG. 1, the mounting blocks 52 are conventionally fixed to the side members 12 *at the second point of connection* by means of fasteners 53 shown as a nut and bolt assembly. A pair of thrust bars 54 extend forwardly from the cross bar 50 and are connected by a nut and bolt assembly 55 to the spreader 36. Preferably, and as shown in FIG. 5, the thrust bars 54, spreader legs 40 and mount frame legs 30 are all connected by the same nut and bolt assembly 55.

*Because the spreader element 36 extends from the box section downwardly and rearwardly below the side members 12, and because the thrust bars 54 extend rearwardly from below the side members 12 to the second point of connection between the vehicle and mounting frame assembly 16, the mounting frame assembly 16 provides a mounting frame having a first point of attachment to the vehicle frame and first and second portions extending rearwardly and forwardly of the first point of attachment; the first portion extending to a second point of attachment to the vehicle located rearwardly of the first attachment point.*

FIGS. 6–9 illustrate a [mount] *mounting* frame assembly 56 which is second alternative embodiment of [mount] *mounting* frame assembly 16 and which is arranged to be mounted on a vehicle having a frame including a centrally located, longitudinally extending frame member 57. Similar to the first alternative [mount] *mounting* frame assembly 16, [mount] *mounting* frame assembly 56 comprises a unitary, rigid structure fixed to the frame of the vehicle. *Also similar to the first alternative mounting frame assembly 16, the mounting frame assembly 56 is substantially entirely located rearwardly of the front of the vehicle's bumper. When the snowplow assembly 18 is removed from the mounting frame assembly 56, the vehicle is left unencumbered by structure forward of the bumper.* The [mount] *mounting* frame assembly 56 includes a laterally extending box section 28. Extending outwardly from each opposite end 31 of box section 28 are *respective* mounting plates 32, *each* having a forward facing surface and having an upwardly facing surface which is adapted to be fixed in a conventional manner to the vehicle chassis *at a first connection point*. The [mount] *mounting* frame assembly 56 also includes *A-frame* mounting lugs 42 which are fixed to [forward] the forward facing surface of mounting plates 32. Preferably, as shown in FIGS. 7 and 8, the mounting lugs 42 are fixed to mounting plates 32 by the fasteners 44.

Mounting frame assembly 56 also includes a rearwardly extending thrust member 58 which extends rearwardly from the center of the box section 28 and which, at its rearward end, is in the form of a mounting plate 60 adapted to be fixed to the centrally located *vehicle* frame member 57 *at a second connection point.*

Figure 6:
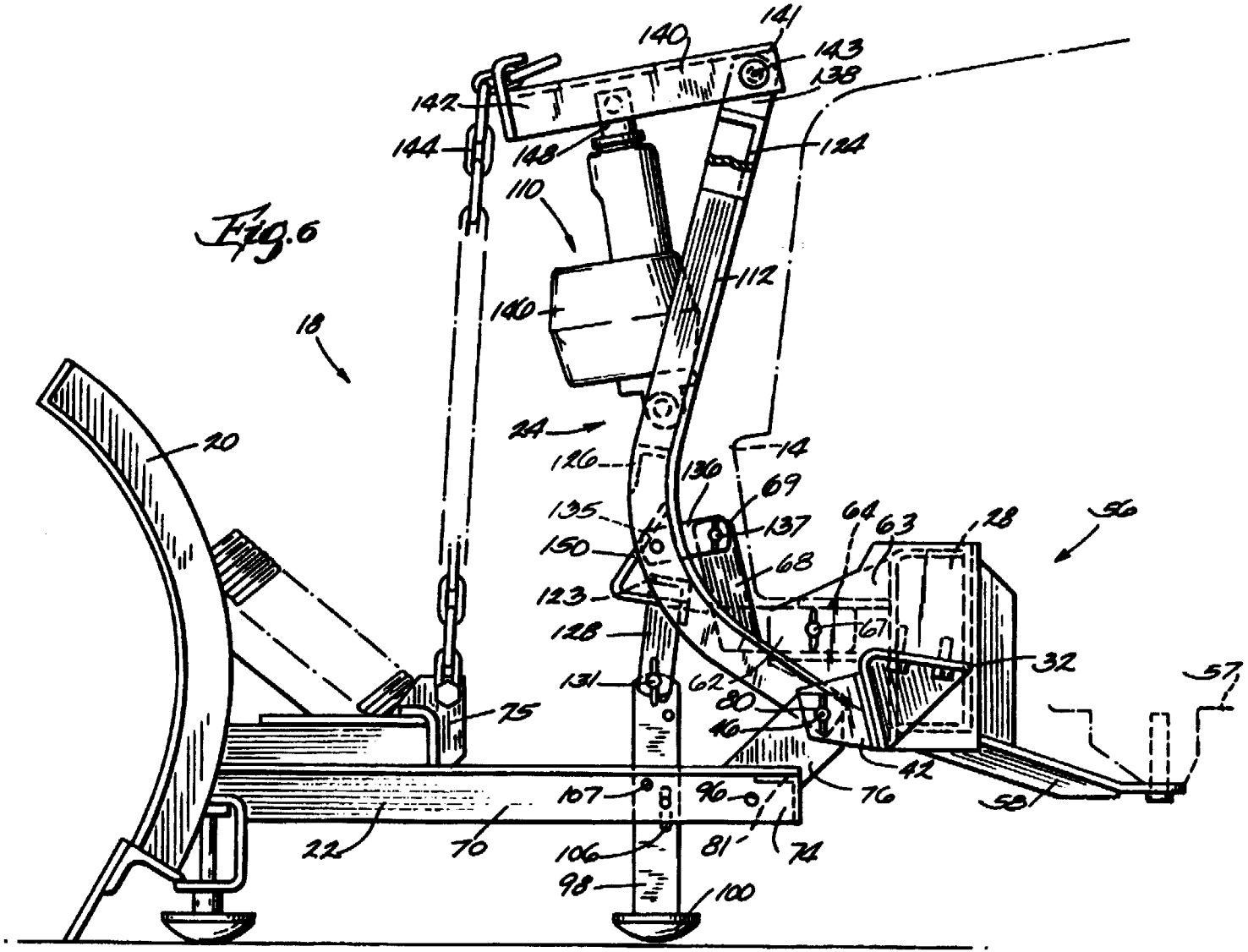
FIG. 6 is a second alternative embodiment of a detachable snowplow blade lift assembly embodying the invention.

The mounting frame assembly 56 also includes (FIG. 8) a forwardly opening socket 62 on the box section 28 intermediate the opposite ends 31. Socket 62 is formed by a pair of *spaced-apart* forwardly extending vertical plates 63 and a pair of *spaced-apart*, forwardly extending horizontal plates 64 [and]. *For reasons discussed below, the socket 62* is adapted to receive [one] *a first* leg 65 of an L-shaped hitch arm 66. The hitch arm 66 (FIGS. 6 and 7) is removably connected to [mount] *mounting* frame 56 by means of a pin connection whereby a hitch arm pin 67 extends through the vertical plates 63 and through *the first* leg 65. The other leg 68 of hitch arm 66 *comprises a pair of spaced-apart plates defining a center link clevis 69 that* extends from the forward end of leg 65 forward of bumper 14 and extends generally upwardly. *As best illustrated by FIG. 6, the A-frame mounting lugs 42 and the socket 62 are located below and rearwardly of the front of the bumper 14. Accordingly, when the hitch arm 66 is removed from the socket 62, such as when the snowplow assembly 18 is removed from the mounting frame assembly 56, the entirety of the mounting frame assembly 56 is located rearwardly of the bumper 14 and is located substantially below the bumper 14. The mounting frame assembly 56 thus also provides a mounting frame that is fixed to the vehicle at a first connection point, has a first portion extending rearwardly below the vehicle frame to a*

*second connection point, and has a second portion extending forwardly from the first connection point below and forwardly of the vehicle bumper.*

*The construction of the mounting frame assembly 56 is particularly advantageous in that it can be fixed to the underside of a vehicle frame and otherwise completely installed without the necessity of removing the bumper from the vehicle. In addition, when the snowplow assembly 18 and hitch arm 66 are removed from the mounting frame assembly 56, the entire mounting frame assembly 56 remaining on the vehicle lies below the plane defined by the upper surface of the bumper and lies behind the plane defined by the forward surface of the bumper.*

The snowplow assembly 18 is releasably connectable to *either* the mounting frame assembly 16 *or alternatively to the mounting frame assembly 56.* FIG. 1 illustrates the snowplow assembly 18 in the "blade-off" position wherein the snowplow assembly 18 is detached from the vehicle. FIGS. 2 and 6 illustrate the snowplow assembly 18 in the "blade-on" position wherein the snowplow assembly 18 is *respectively* connected to *either* the mounting frame assembly 16 *or the mounting frame assembly 56. The construction of the A-frame 22 need not be modified for use of the A-frame 22 with the alternative mounting frame assemblies 16, 56. Accordingly, with respect to the A-frame construction, reference will be made only to mounting frame 16 with the understanding that exceptions to the compatibility of the A-frame 22 with both mounting frame assemblies 16 and 56 will be expressly noted.* The A-frame 22 comprises (FIGS. 1, 11) a pair of side members 70 each having forward and rearward ends 72, 74. The rearward ends 74 of the side members 70 are generally laterally spaced-apart and the forward ends 72 are closely-spaced and are joined by (FIG. 1) an A-frame apex plate 75. A pair of A-frame mounting plates 76 extend generally vertically from the upper surfaces of the respective side members 70 adjacent the respective rearward ends 74. The A-frame mounting plates 76 have a portion extending rearwardly of the rearward ends 74 of side members 70 and are arranged so that they can be moved into registry between the vertical plates [47] *45* of the A-frame mounting lugs 42. Each of the A-frame mounting plates 76 have therethrough a hinge pin hole 78. The hinge pin holes 78 are coaxially aligned and can be moved into alignment with the hinge pin holes 47 in the A-frame mounting lugs 42 so that the respective hinge pin holes 47, 78 in the A-frame mounting lugs 42 and plates 76 are coaxially aligned on the pivot axis 46 and are adapted to receive (FIGS. [1, )] *2, 6 and* 11) a removable hinge pin 80. A pair of hinge pins 80 can be inserted into the aligned hinge pin holes 47, 78 to join the mounting lugs 42 and mounting plates 76 to afford pivotal rotation [between] *of* the A-frame 22 [and] *relative to* the mounting frame assembly 16 about the pivot axis 46.

Figure 11:
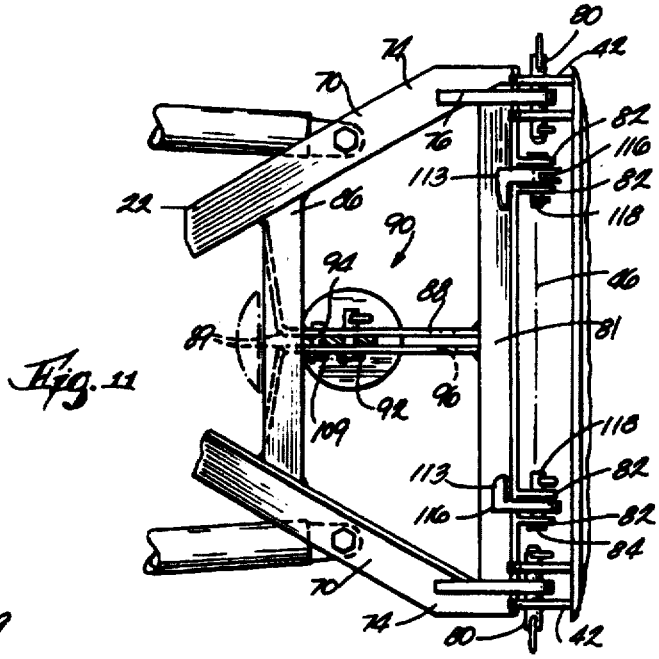
FIG. 11 is a cross-sectional view taken along line 11—11 in FIG. 1.

The A-frame 22 also includes (FIGS. 10, 11) a laterally extending base member 81 supported by the rearward ends 74 of the A-frame side members 70. A pair of lift frame clevises 82 are located on the rearward facing surface of the base member 81 and are located [between the] *inwardly of the pair of* A-frame mounting plates 76. Each lift frame clevis 82 has therethrough a bolt hole 84 and *each clevis 82* is arranged so that bolt holes 84 are coaxially aligned with pivot axis 46 and with hinge pin holes 78 in the A-frame mounting plates 76. [The] *For reasons discussed below, the* A-frame 22 also includes (FIG. 11) a cross-bracket 86 which extends laterally between the A-frame side members 70 [and], which is located forward of the base member 81 and *which is located* rearward of the apex plate 75. The A-frame 22 also includes a support stand bracket 88 comprising a pair of *spaced-apart* bracket plates 89 extending between the cross-bracket 86 and the base member 81. As shown in FIG. 11, the forward ends of the plates 89 flare outwardly laterally [at] *beneath* the cross-bracket 86.

The snowplow assembly 18 also includes support stand means 90 for supporting the snowplow assembly 18 in the "blade-off" position so that the side members 70 are substantially horizontal. The support *stand means 90 includes the* stand bracket 88 [includes] *and* a pivot pin 92 fixed to, and extending between the bracket plates 89. The bracket 88 also includes a center pin hole 94 *that is* located in the bracket plates 89 between the cross-bracket 86 and the pivot pin 92 [and]. *The bracket also includes* a first storage pin hole 96 *that is* located rearward of the pivot pin 92 and forward of base member 81. The support stand means 90 also includes a support stand 98 having a leg 99 located between the bracket plates 89. The support stand 98 includes, at one end of leg 99, a generally dish-shaped base 100 and, at-the other, free end of leg 99, a plurality of pin holes 101 including a second storage pin hole 102. Leg 99 has therethrough an elongated slot 106 surrounding the pivot pin 92, thereby affording pivotal and translational movement of leg 99 relative to the support bracket 88 [and affording rotation of the]. *The* support stand 98 *is moveable* between (FIG. 1) a "blade-off" support position wherein support leg 99 is vertically oriented and the base 100 is on the ground and (FIG. 2) a "blade-on", storage position wherein the support stand 98 is generally horizontal. Leg 99 also has therethrough (FIG. 1) a center pin hole 107 located adjacent one end of slot 106.

When the *support* stand 98 is in the horizontal "blade-on" storage position, the storage pin hole 102 in the leg 99 aligns with the *first* storage pin hole 96 in the support bracket 88 so that a removable storage pin 108 can be inserted therethrough to retain the support stand 98 in the storage position. When the snowplow assembly 18 is attached to the vehicle and the support stand 98 is in the "blade-on" position, leg 99 is substantially received between the plates 89 of the bracket 88 and the base 100 is [received between the outwardly flared forward ends of plates 89] *held in a raised position forward of the cross bracket 86* so that base 100 does not interfere with plowing.

When the snowplow assembly 18 is in (FIG. 1) the "blade-off" position, the support stand 98 can be moved to the vertical support position so that the base 100 rests on the ground. In a manner described below, the A-frame side members 70 can be moved upwardly relative to support stand 98 so that pivot pin 92 translates to the upper end of slot 106 and so that center pin holes 94 and 107 in the bracket 88 and leg 99 respectively are aligned. A center pin 109 can then be inserted into the center pin holes 94 and 107 to prevent movement of leg 99 relative to the A-frame 22 and to prevent tipping of the support stand 98 and the snowplow assembly 18.

The lift frame assembly 24 is permanently pivotally mounted on the A-frame 22 and *can be fixed to the mounting frame assemblies 16, 56. The lift frame assembly 24 supports a lighting fixture 160 including lights 149 and brackets 148. Brackets 148 are attached to side members 112 and cross member 124 of the lift frame assembly 24. The lift frame assembly also* includes actuator means 110 for pivotally raising and lowering *the* A-frame 22 and the snowplow blade 20 about the pivot axis 46. [Lift] *In general, and as more specifically discussed below, when the lift frame assembly 24 is fixed to one of the mounting frame assemblies 16, 56, the lifting frame assembly supports the lights 149 in fixed position relative to the vehicle and affords the raising*

*and lowering of the snowplow assembly 18. Also, the* frame assembly 24 is pivotally connected to the A-frame base member 81 so that the snowplow assembly 18 and the lift frame assembly [22] *24* can be removed from the vehicle as a unit, the actuator means 110 *and the lighting fixture 160* also being removed as part of that unit.

Lift frame assembly 24 includes (FIGS. 1[, 10, 11] *and 10*) a pair of goose neck side members *112* each having a lower portion 113 pivotably connected to a respective one of the lift frame clevises 82. The lower portion 113 of each side member 112 curves forwardly and upwardly from the base member 81 to an upper portion 114 which extends in front of and vertically past the bumper 14. The lower portions 113 of each side member 112 have fixed thereto a lift frame mounting [plane] *plate* 115 having a bolt hole 116 therethrough so as to align with the bolt holes 84 in the lift frame clevises 82 and so as to be coaxially aligned with pivot axis 46. Bolt 118 (*shown only in FIG. 11*) pivotally connects lower portions 113 of side members 112 and base member 81 of A-frame 22 so that the lift frame assembly 24 [and the A-frame 22] is pivotable about the pivot axis 46 [and is pivotable] relative to the *A-frame 22 and relative to the* mounting frame assembly 16 [about pivot axis 46].

Figure 10:
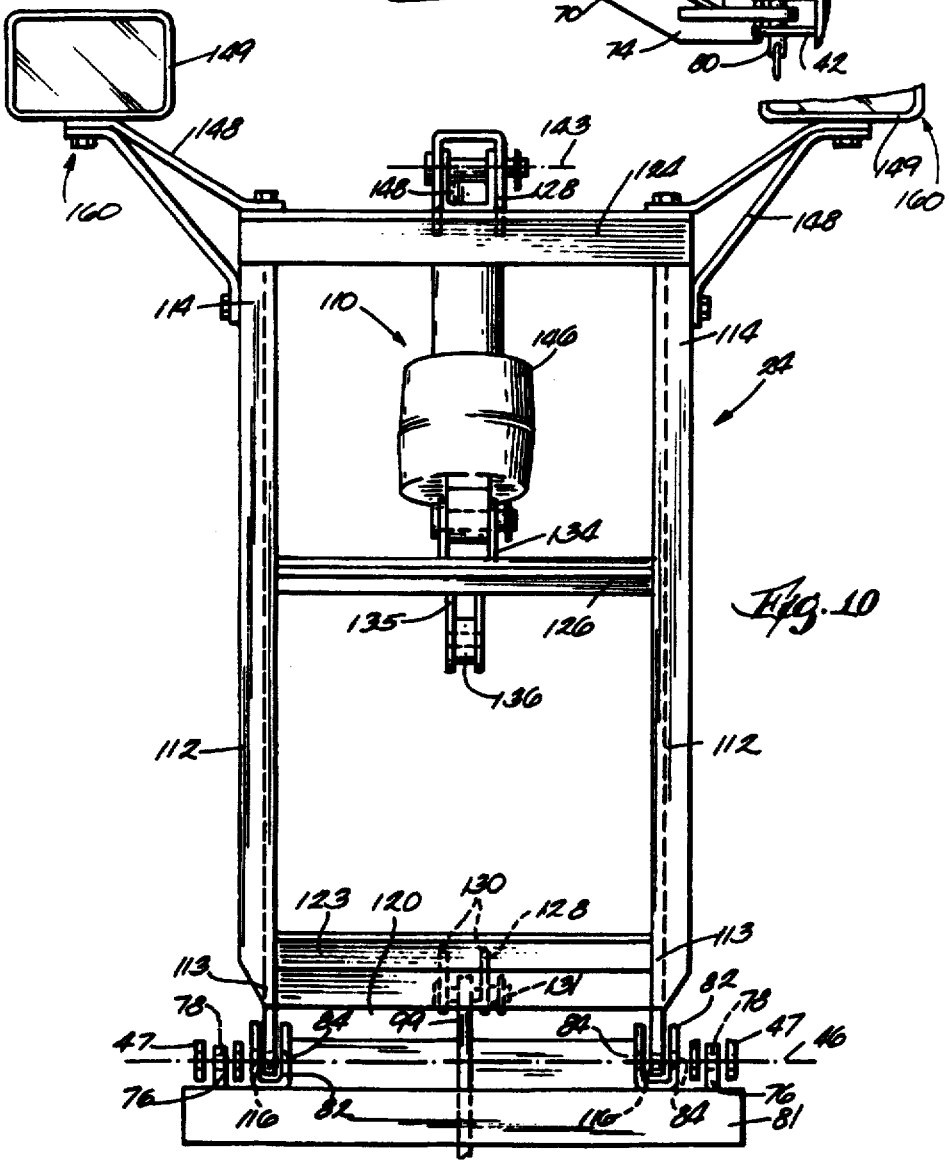
FIG. 10 is a cross-sectional view taken along line 10—10 in FIG. 1.

The lift frame assembly 24 also includes a plurality of *cross members* extending between the goose neck side members [120] *112*. Depending upon whether the first alternative embodiment of the [mount] *mounting* frame assembly 16 is used, or whether the second alternative embodiment of the [mount] *mounting* frame assembly 56 is used, the lift frame assembly 24 can have various arrangements of cross members. For example, FIGS. 1 and 10 illustrate a first alternative embodiment of the lift frame assembly 24 which is adapted for use with the first alternative embodiment of the [mount] *mounting* frame assembly 16 (shown in FIGS. 1–5). FIG. 6 illustrates a second alternative embodiment of the lift frame assembly 24 which is adapted for use with the second alternative embodiment of the [mount] *mounting* frame assembly 56 (shown in FIGS. 5–8). As illustrated, however, both disclosed alternative embodiments of lift frame assembly 24 include a support stand cross member 123 extending laterally between lower portions 113 of the goose neck side members [120] *112*, an upper cross member 124 extending laterally between the upper portions 114 of the goose neck side members 112 and an intermediate cross member 126 extending laterally between the goose neck side members 112 between the support stand cross member 123 and the upper cross member 124.

The support stand cross member 123 supports (FIGS. 1, 6, 10) a [forwardly extending] support stand clevis 128 which is centrally located between the goose neck members [120] *112* and which is connectable with the upper, free end of the support leg 99 when the support stand 98 is in the vertical "blade-off" position. The support stand clevis 128 comprises [(FIG. 10)] a pair of spaced-apart plates 130 (*FIG. 10*) each having therethrough a storage pin hole 132 (*FIG. 2*) which can be aligned with one of the holes 101 in the support stand 98. [When] *As best shown in FIG. 1, when* in the "blade-off" position, support stand 98 can moved relative to the A-frame 22 virtue of the slot 106/pin 92 connection and can be moved so that the free end of [lug] *support leg* 99 is located between clevis plates 130 and so that one of storage pin holes 101 [align] *aligns* with storage pin hole 132. Support stand 98 can then be fastened to the support stand clevis 128 in its "blade-off" position by inserting a storage pin 131 into the *aligned storage pin* holes 101, 132. As shown in FIG. 6, when the A-frame 22 is connected to the mounting frame 16 and when the support stand 98 is pinned to the [lift frame 24] *support stand clevis 128*, base 100 of the support stand 98 may be spaced from the ground.

[The] *In the embodiment of the lift frame assembly 24 shown in FIGS. 1, 2 and 10, the* intermediate cross member 126 supports thereon a centrally located actuator mounting clevis 134 that opens generally upwardly and also supports thereon a [rearwardly extending] hitch clevis 135 and *a rearwardly extending* mount frame link 136. When the A-frame 22 is fixed to the [mount] *mounting* frame assembly 16, the lift frame assembly 24 can be pivoted rearwardly (clockwise in FIG. 1) from its "blade-off" storage position toward the vehicle and toward [mount] *the mounting* frame assembly 16 to (FIGS. 2, 6) a "blade-on" position wherein the mount frame link 136 can be connected to the mount frame clevis 34 or, in the case of mount frame assembly 56, to the *center link clevis 69 on the* hitch arm 68 by a hitch pin 137 to prevent relative movement between the lift frame assembly 24 and the mounting frame assembly 16.

*In the embodiment of the lift frame assembly 24 shown in FIG. 6, the intermediate cross member 126 and the lower cross member 123 support a hitch clevis 135 extending therebetween. A mounting frame link 136 extends rearwardly from the hitch clevis 135.*

[The] *As shown in FIGS. 1, 6 and 10,* upper cross member 124 pivotally supports thereon a lift arm support lug 138 and a pivotable lift channel or arm 140 having a first end 141 supported by the lift arm support lug 138 and a second, forward end 142 extending generally forward of the upper cross member 124. The pivotal connection of the upper cross member 124 and the lift arm 140 affords relative pivotal movement therebetween about (FIG. 10) a generally horizontal axis 143. The forward end 142 of the lift arm 140 is in the form of a chain hook and is connected to a chain 144 extending between the chain hook and the A-frame apex plate 75.

*The lift frame assembly 24 also includes the lighting fixture 160. The lighting fixture 160 includes (FIG. 10) a pair of headlamp brackets 148 which extend laterally outwardly and upwardly from the upper portions 114 of respective goose neck side members 112. Each headlamp bracket 148 supports a respective head lamp 149. As mentioned above, when the lift frame assembly 24 is mounted on one of the mounting frame assemblies 16, 56, the lighting fixture 160 is fixed to the vehicle in a position over the snowplow blade 20. Such positioning and support of the lighting fixture 160 provides a lighting fixture 160 that is operational during plowing of snow and that is removable from the vehicle as a unit with the snow plow assembly 18. It is operational in the sense that the lights are above the plow in both its upper position (travel/stacking) and lower position (plowing) and thus the plow blade does not interfere with the light rays. Also, the lights being fixed relative to the vehicle, their orientation is not affected by movement of the plow blade.*

The lift frame assembly 24 also includes a conventional hydraulic actuator 146 having a lower end pivotally supported by the actuator mounting lug 134 and having a piston rod 148 pivotally connected with the lift arm 140 so that extension of the piston rod 148 rotates (or raises) the lift arm 140 about axis 143 and causes rotation, by the chain connection, of the A-frame 22 and the plow blade 20 about the pivot axis 46. *While conventional constructions for actuator means 146 can be used, U.S. Pat. No. 4,999,935 entitled "Hydraulic System and Apparatus for Use with Vehicle Accessory Units" which issued to Simi, et al, on Mar.*

*19, 1991 illustrates a preferred construction of the actuator means 146.* The hydraulic actuator means 146 remains fixed to the lift frame assembly 24 and preferably provides a source of hydraulic pressure so that detachment of the snowplow assembly 18 and lift frame assembly 24 does not require disconnection of any hydraulic lines. Rather, disconnection of the actuator means 146 *and the lighting fixture 160* from the vehicle requires only the disconnection of [a pair of electrical connections 149. While conventional constructions for actuator means 146 can be used, U.S. Pat. No. 4,999,935 entitled "Hydraulic System and Apparatus for Use with Vehicle Accessory Units" which issued to Simi, et al, on Mar. 19, 1991 illustrates a preferred construction of the actuator means 146.] *an electrical connection 147.*

The detachable snowplow blade lift assembly 10 thus provides A-frame mounting means for releasably and pivotally connecting the A-frame 22 and the mounting frame assembly 16 for relative pivotal movement therebetween about a generally horizontally extending pivot axis 46 and lift frame mounting means for connecting the lift frame assembly 24 to the A-frame 22 for selective relative pivotal movement about the pivot axis 46 and for releasably fixing the lift frame assembly 24 relative to the mounting frame assembly 16.

The snowplow assembly 18 and lift frame assembly 24, with the actuator means 110 *and lighting fixture 160*, can be attached as a unit to the vehicle by the following steps: first, the vehicle can be moved into close proximity to the rearward ends 74 of the A-frame 22 so that the A-frame mounting lugs 42 and the A-frame mounting plates 76 are registered. Alternatively, the snowplow assembly 18 can be pushed into position at the front of the vehicle without risk of tipping the A-frame 22 because of the locking engagement of the center pin 109, the support stand 98 and the support stand bracket 88. Once the mounting plates 76 are registered between the respective mounting lugs 42, the center pin 109 can be removed from the support stand 98 and *the* support stand bracket 88 to afford limited translation of support stand 98 (by virtue of the slot 106/pin 92 arrangement) relative to pivot pin 92. Due to the substantial weight of actuator means 110, the center of gravity of the lift frame assembly 24 when in its storage position is located forward of the support stand so that the lift frame assembly has a tendency to rotate forwardly (counter-clockwise in FIG. 1). Due to the pin connection of the lift frame assembly 24 and the A-frame 22 and due to the pinned connection of the lift frame clevis 128 and the support stand 98, the weight of the A-frame 22 is borne by the pin 131 and by the support stand 98. The weight of lift frame assembly 24 pulls the A-frame upwardly about a center of rotation at the plow blade 20 so that pivot pin 92 moves to the top or to the upper end of slot 106.

The A-frame mounting plates 76 can be moved with respect to the A-frame mounting lugs 42 in order to vertically align the hinge pin holes 47, 78 by rotating the lift frame assembly 24 relative to the A-frame 22 about the pivot axis 46. Such rotation of the lift frame assembly 24 causes pivotal movement of A-frame side members 70 about a center of rotation at the plow blade 20 and causes nearly vertical movement of the rearward ends 74 of the side members 70. This resultant vertical displacement of the mounting plates 76 is possible by virtue of the pinned connection between the support stand clevis 128 and the upper end of support leg 99 and the slot 106/pin 92 relationship of the support stand 98 and the support stand bracket 89. By using the side members [120] *112* as a lever to rotate the lift frame assembly 24 rearwardly from its "blade-off" storage position (clockwise in FIG. 1) the mounting plates 76 can be moved slightly rearwardly and downwardly (shown in phantom) to adjust the height of the A-frame 22 and to align the hinge pin holes 47, 78. When the hinge pin holes 47, 78 are aligned, a pair of hinge pins 80 are inserted to connect the mounting lugs 42 and the mounting plates 76 so as to pivotally connect the A-frame assembly 22 to the [mount] *mounting* frame assembly 16 for rotation therebetween about the pivot axis 46. Thus the snowplow blade lift assembly 10 includes lift stand means for alternatively selectively preventing and affording relative movement between the support stand and the A-frame to adjust the vertical position of the A-frame with respect to the mounting lugs 42.

The lift frame assembly 24 can then be connected to the [mount] *mounting* frame assembly 16. Since center pin 109 is removed from bracket 88, lift frame assembly 24 can freely rotate about the pivot axis 46 relative to the A-frame 22. The lift frame assembly 24 can be rotated rearwardly (clockwise in FIGS. 1, 2) to register the mount frame link 136 (FIG. 2) with, in the case of [mount] *mounting* frame assembly 16, the [mount] *mounting* frame clevis 34 or, in the case of [mount] *mounting* frame assembly 56 (FIG. 6), *the center link clevis 69 on* the forward end 68 of the hitch arm 66. When the holes in the mount frame link 136 and the mount frame clevis 34 or [hitch arm 68] *center link clevis 69* are aligned, hitch pin 137 can be placed therethrough to fix the lift frame assembly 24 to the [mount] *mounting* frame assembly 16. Preferably, the center pin 109 for locking the support stand 98 in the "blade-off" position is also used as hitch pin 137 to fix the [mount] *mounting* frame link 136 and the [mount] *mounting* frame clevis 34 or hitch arm 68.

When, as shown in FIG. 6, the A-frame assembly 22 and lift frame assembly 24 are fixed to the [mount] *mounting* frame assembly 16, the support stand 98 can then be rotated from its vertical, "blade-off" position (FIG. [2] *1*) to its horizontal "blade-on" position and held in place by the support stand pin 108 extending through the respective storage pin holes 96, 102 in the support stand bracket 89 and support leg 99. Preferably, the storage pin 131 which is used to connect the support stand 98 and the support stand clevis 128 is also used as storage pin 108 for securing the support stand 98 in the "blade-off" position. Last, *the* electrical *connection* 147 for *the hydraulic* actuator 110 *and the lighting fixture 160* can be connected to a source of electric current in the vehicle in a conventional manner.

As shown in FIG. 2, the lift frame assembly supports the actuator mechanism *146* for raising and lowering the A-frame 22 and snowplow blade 20 about the pivot axis 46 in an elevated position above the bumper of the vehicle. Further, the goose neck side members 112 and the mount frame assembly 16 are located in close proximity to the bumper 14 and provide a range of free upward pivotal movement of the A-frame 22 about the pivot axis 46. Such a range of free movement (shown in phantom in FIG. 2) is desirable in order to provide a detachable snowplow blade lift assembly having the capacity to stack snow. Such a range of free movement also provides greater ground clearance for the plow blade 20 when the vehicle travels with the plow assembly in a raised position. In the disclosed embodiment, the A-frame 22 can pivot about pivot axis 46 to an upwardly rotated position approximately 40 degrees from horizontal, which range is limited by (FIG. 6) a pair of A-frame stops 150 located on the side members 112 in such a position so as to prevent damage to the actuator means 110 during stacking of snow and during travel with the snowplow assembly 18 in a raised position.

While capable of stacking snow, the disclosed snowplow assembly *18* also provides a lift frame assembly *24* which, when mounted on the vehicle, supports the lights *149* in fixed relation to the vehicle and which is connectable and disconnectable with the A-frame 22 from the mounting frame 16 as a unit. [Providing] *The provision of* a lift frame *24* which [is capable of supporting] *supports* the lights *149 so as to be permanently fixed to the snowplow assembly 18 and removable from the vehicle as a unit with the snowplow assembly* is desirable [and providing]. *In addition, the provision of* a headlight [support] *fixture 160 which is* fixed relative to the vehicle *during plowing* is necessary for safe and efficient plowing of snow.

To remove the snowplow assembly 18 and lift frame assembly 24, with the lift actuator 110 *and lighting fixture 160*, as a unit from the mount frame assembly 16, the pined connections described above can be released in reverse order.

In addition to ease of attachment and removal, the overall unit, plow blade, A-frame, lift frame assembly and lift actuator, as a result of the construction and arrangement of the component parts is particularly well adapted for storage as a unit.

Various other features of the invention are set forth in the following claims:

We claim:

1. A vehicle mounted snowplow blade assembly comprising a vehicle having a frame member and a bumper, a [mount] *mounting* frame fixed to the frame member and located generally behind the bumper, a snowplow blade assembly including an A-frame and a snowplow blade fixed to the A-frame, a lift frame supported by the A-frame, and mounting means for selectively connecting the A-frame to the mounting frame for pivotable movement about a generally horizontally extending pivot axis and for affording removal of the A-frame and the lift frame from the mounting frame as a unit so as to leave the [mount] *mounting* frame on the vehicle and behind the bumper.

2. A vehicle mounted snowplow blade lift assembly as set forth in claim 1 wherein the mounting means includes means for selectively connecting the lift frame and the [mount] *mounting* frame and wherein, when the lift frame and the [mount] *mounting* frame are connected, the A-frame is pivotable about said axis relative to the lift frame and the [mount] *mounting* frame.

3. A vehicle mounted snowplow blade lift assembly as set forth in claim 1 wherein said lift frame is supported by said A-frame for pivotable movement about said pivot axis, and wherein the mounting means includes means for selectively connecting the lift frame and the [mount] *mounting* frame.

4. A vehicle mounted snowplow blade lift assembly as set forth in claim 3 wherein the mounting means affords a range of free upward pivotal movement of said A-frame when said snowplow assembly is connected to said [mount] *mounting* frame.

5. A vehicle mounted snowplow blade lift assembly as set forth in claim 4 wherein the range of movement is approximately 40 degrees from horizontal.

6. A vehicle mounted snowplow blade lift assembly as set forth in claim 1 and further including actuator means supported by the lift frame for pivoting the snowplow assembly about the pivot axis to raise and lower said snowplow blade assembly.

7. A vehicle mounted snowplow blade lift assembly as set forth in claim 6 wherein the lift frame supports the actuator means above the bumper.

8. A vehicle mounted snowplow blade lift assembly as set forth in claim 1 wherein the mounting means affords removal of the A-frame and the lift frame from the vehicle so that the vehicle is substantially unencumbered by structural members in front of the bumper.

9. A vehicle mounted snowplow blade lift assembly as set forth in claim 1 wherein the snowplow assembly includes support stand means for supporting the A-frame in a generally horizontal position and, when the A-frame is not connected to the mounting frame, for selectively adjusting the vertical position of the snowplow assembly.

10. A vehicle mounted snowplow blade lift assembly as set forth in claim 9 wherein the support stand means includes a support leg pivotally supported by the A-frame and includes means for selectively and alternatively affording and preventing rotation of the support leg.

11. A vehicle mounted snowplow blade lift assembly as set forth in claim 10 wherein the lift frame is pivotally supported by the A-frame, and wherein the support stand means includes means for releasably connecting the support leg and the lift frame so that pivotal movement of the lift frame adjusts the vertical position of the A-frame.

12. A vehicle mounted snowplow blade lift assembly as set forth in claim 11 wherein the lift frame is supported by the A-frame for pivotal movement about the pivot axis.

13. A vehicle mounted snowplow blade assembly comprising a vehicle frame, a mounting frame connected to the vehicle frame, a snowplow assembly including an A-frame and a snowplow blade mounted on the A-frame, A-frame mounting means for releasably and pivotally connecting the A-frame and the mounting frame for relative pivotal movement therebetween about a generally horizontally extending pivot axis, a lift frame, lift frame mounting means for connecting the lift frame and the A-frame for selective relative pivotal movement therebetween about the pivot axis and for releasably connecting the lift frame to the mounting frame, and actuator means on the lift frame for selectively causing pivotal movement of the A-frame about the pivot axis relative to the [mount] *mounting* frame.

14. A vehicle mounted snowplow blade lift assembly as set forth in claim 13 wherein the vehicle frame includes a bumper, wherein the mounting frame is located substantially behind the bumper, and wherein the A-frame mounting means and the lift frame mounting means afford removal of the snowplow assembly and the lift frame from the vehicle so as to leave the front of the vehicle forward of the bumper unencumbered and so as to leave the [mount] *mounting* frame behind the bumper.

15. A vehicle mounted snowplow blade lift assembly as set forth in claim 14 wherein the lift frame is supported by the A-frame and extends upwardly therefrom in front of the bumper.

16. A vehicle mounted snowplow blade lift assembly as set forth in claim 15 wherein the lift frame supports the actuator means above the bumper.

17. A vehicle mounted snowplow blade lift assembly as set forth in claim 13 wherein the A-frame mounting means and the lift frame mounting means afford removal of the snowplow assembly and the lift frame from the vehicle as a unit.

18. A vehicle mounted snowplow blade lift assembly as set forth in claim 17 wherein the A-frame mounting means affords a range of free upward pivotal movement of the snowplow assembly about the pivot axis.

19. A vehicle mounted snowplow blade lift assembly comprising a vehicle having a frame member, a mount frame supported by the frame member, the mount frame having thereon a mounting lug, a snowplow assembly including an A-frame, a snowplow blade supported by the A-frame, A-frame mounting means for selectively connecting the A-frame and the mount frame, and a support stand pivotally connected to the A-frame for rotation between a blade-on position wherein the support stand is generally parallel to the A-frame and a blade-off position wherein the support stand is generally vertical and supports the A-frame in a generally horizontal position, and lift frame means for alternatively selectively preventing and affording relative movement between the A-frame and [of] the support stand to adjust the vertical position of the A-frame with respect to the mounting lug.

20. A vehicle mounted snowplow blade lift assembly as set forth in claim 19 wherein the A-frame mounting means includes means for pivotally connecting the A-frame and the mount frame for relative rotation therebetween about a generally horizontal pivot axis, wherein the lift frame means includes a lift frame pivotally supported on the A-frame and *said support stand is* releasably connectable to [the support stand] *said lift frame*.

21. A vehicle mounted snowplow blade lift assembly as set forth in claim 20 wherein, when the lift frame is connected to the support stand, rotation of the lift frame about the axis causes movement of the support stand relative to the A-frame.

22. A vehicle mounted snowplow blade lift assembly as set forth in claim 21 wherein the A-frame and the lift frame are pivotable about a common axis.

23. A vehicle mounted snowplow blade lift assembly as set forth in claim 22 wherein the lift frame supports actuator means for rotating the A-frame about the pivot axis.

24. A vehicle mounted snowplow blade lift assembly as set forth in claim 19 wherein the A-frame mounting means affords a range of free upward movement of the snowplow assembly.

25. A vehicle mounted snowplow blade lift assembly as set forth in claim 24 wherein the A-frame mounting means provides a pivotable connection between the mounting frame and the A-frame.

26. A vehicle mounted snowplow blade lift assembly as set forth in claim 25 wherein the range of movement is from horizontal to approximately 40 degrees from horizontal.

*27. A snowplow blade assembly connected to a vehicle having a frame and a forward bumper and comprising*

*a mounting frame having a first point of attachment to said vehicle frame,*

*said mounting frame including a first portion extending, relative to said vehicle, rearwardly of said first point of attachment to a second point of attachment to said vehicle frame, said mounting frame further including a second portion extending, relative to vehicle, forwardly of said first point of attachment, said first and second frame portions being located beneath said frame and said second frame portion extending forwardly beneath said bumper,*

*a snowplow assembly including an A-frame and a snowplow blade mounted on the A-frame,*

*A-frame mounting means for releasably and pivotally connecting the A-frame and the mounting frame for relative pivotal movement therebetween about a generally horizontally extending pivot axis,*

*a lift frame,*

*lift frame mounting means for connecting the lift frame and the A-frame for selective relative pivotal movement therebetween about the pivot axis and for releasably connecting the lift frame to the mounting frame,*

*said lift frame including elongated support means extending from said A-frame upwardly and forward of said bumper to an upper end, and*

*actuator means on the lift frame for selectively causing pivotal movement of the A-frame about the pivot axis relative to the mounting frame.*

*28. The snowplow blade assembly of claim 27 wherein said elongated support means comprises*

*first and second vertically extending elongated members, and*

*means connecting said elongated members in laterally spaced relationship,*

*and wherein said actuator means is connected to said elongated support means between said elongated members.*

*29. The snowplow blade assembly of claim 27 wherein said elongated support means includes first and second vertically extending members, said first and second vertically extending members, relative to said bumper, bow outwardly and upwardly to a point generally in front of said bumper and then continue an extension upwardly from said point to a terminal end above said bumper.*

*30. The snowplow blade assembly of claim 27 wherein*

*said mounting frame includes a link extending forwardly and upwardly relative to said bumper and also includes A-frame receiving means located below said link, said A-frame mounting means including said A-frame receiving means, and*

*including means connecting said link to said elongated support means above said A-frame receiving means.*

*31. The snowplow blade assembly of claim 30 wherein said link is located behind said bumper.*

*32. The snowplow blade assembly of claim 31 wherein said link is releasably connected in said mounting frame so that said link is selectively removable therefrom.*

*33. The snowplow blade assembly of claim 27 wherein the snowplow assembly includes support stand means for supporting the A-frame in a generally horizontal position and, when the A-frame is not connected to the mounting frame, for selectively adjusting the vertical position of the snowplow assembly.*

*34. The snowplow blade assembly of claim 27 wherein said elongated support means comprises*

*first and second vertically extending elongated members, and*

*said first and second vertically extending members, relative to said bumper, bow outwardly and upwardly to a point generally in front of said bumper and then continue an extension upwardly from said point to a terminal end above said bumper.*

*35. The snowplow blade assembly of claim 27 wherein*

*said mounting frame includes a link extending forwardly and upwardly relative to said bumper and also includes A-frame receiving means located below said link, said A-frame mounting means including said A-frame receiving means, and*

*including means connecting said link to said elongated support means above said A-frame receiving means.*

*36. The snowplow blade assembly of claim 27 wherein the pivotal axis of said A-frame relative to said A-frame receiving means and the pivotal axis of said lift frame relative to said A-frame are co-axial.*

*37. A snowplow blade assembly connected to a vehicle having a frame and a forward bumper and comprising*

*a mounting frame attached to said vehicle frame behind and beneath said bumper and including a portion extending forwardly beneath the level of said bumper,*

*a snowplow assembly including an A-frame and a snowplow blade mounted on the A-frame,*

*A-frame mounting means for releasably and pivotally connecting the A-frame and the mounting frame for relative pivotal movement therebetween about a generally horizontally extending pivot axis,*

*said mounting frame including a link extending forwardly and upwardly relative to said bumper and also including A-frame receiving means located below said link, said A-frame mounting means including said A-frame receiving means,*

*a lift frame,*

*said lift frame including elongated support means extending from said A-frame upwardly and forward of said bumper to an upper end,*

*lift frame mounting means for connecting the lift frame and the A-frame for selective relative pivotal movement therebetween and for releasably connecting the lift frame to the mounting frame, said lift frame mounting means including said link and said link being connected to said elongated support means above said A-frame receiving means,*

*said A-frame receiving means having a releasable connection to said A-frame and said link having a releasable connection to said elongated support means, and*

*actuator means on the lift frame for selectively causing pivotal movement of the A-frame about the pivot axis relative to the mounting frame.*

*38. A vehicle mounted snowplow blade assembly comprising*

*a vehicle having a frame member and a bumper,*

*a mounting frame fixed to the frame member and located generally behind the bumper,*

*a snowplow blade assembly including an A-frame and a snowplow blade fixed to the A-frame,*

*a light fixture supported by the A-frame and including a headlamp located above the snowplow blade, and*

*mounting means for selectively connecting the A-frame to the mounting frame for pivotable movement about a generally horizontally extending pivot axis and for affording removal of the A-frame and the light fixture from the mounting frame as a unit so as to leave the mounting frame on the vehicle and behind the bumper.*

*39. A snowplow blade assembly as set forth in claim 38 and further including actuator means supported by a lift frame for pivoting the snowplow blade assembly about the pivot axis to raise and lower the snowplow blade assembly.*

*40. A snowplow blade assembly as set forth in claim 38 wherein the lift frame includes a pair of upright members, each of which have a lower end connected to the A-frame and an upper end supporting the light fixture and wherein said upright members have a pivot connection to said A-frame co-axial with said pivot axis of said A-frame.*

*41. A snowplow blade assembly connected to a vehicle having a frame and a forward bumper and comprising*

*a mounting frame having a first point of attachment to said vehicle frame,*

*said mounting frame including a first portion extending, relative to said vehicle, rearwardly of said first point of attachment to a second point of attachment to said vehicle frame, said mounting frame further including a second portion extending, relative to vehicle, forwardly of said first point of attachment, said first and second frame portions being located beneath said frame and said second frame portion extending forwardly beneath said bumper,*

*a snowplow assembly including an A-frame and a snowplow blade mounted on the A-frame,*

*A-frame mounting means for releasably and pivotally connecting the A-frame and the mounting frame for relative pivotal movement therebetween about a generally horizontally extending pivot axis,*

*an accessory frame supported by the A-frame, said accessory frame including at least one elongated support member extending from said A-frame upwardly and forward of said bumper to an upper end, and*

*a headlamp supported by the upper end of the elongated support member.*

*42. The snowplow blade assembly of claim 41 wherein said headlamp is supported above the snowplow blade,*

*said at least one elongated support member, relative to said bumper, bows outwardly and upwardly to a point generally in front of said bumper and then continues an extension upwardly from said point to said upper end, and*

*wherein said elongated support member has a pivot connection to said A-frame co-axial with said pivot axis of said A-frame.*

*43. A snowplow blade assembly as set forth in claim 1 wherein the lift frame supports a light fixture in a position above the snowplow blade.*

*44. A snowplow blade assembly as set forth in claim 43 wherein mounting means affords removal of the A-frame, the lift frame, and the light fixture as a unit from the mounting frame.*

*45. A vehicle mounted snowplow blade assembly comprising*

*a vehicle having a frame member and a bumper,*

*a mounting frame fixed to the frame member and located generally behind the bumper,*

*a snowplow blade assembly including an A-frame and a snowplow blade fixed to the A-frame,*

*a support frame connected to the A-frame, and*

*wherein the A-frame and the support frame are connected to the mounting frame for pivotable movement of the A-frame about a generally horizontally extending pivot axis and for affording removal of the A-frame and the support frame from the mounting frame as a unit so as to leave the mounting frame on the vehicle and behind the bumper.*

*46. A vehicle mounted snowplow blade assembly comprising*

*a vehicle frame member and a vehicle bumper,*

*a snowplow blade assembly including a first frame and a snowplow blade connected to said first frame,*

*mounting means for selectively connecting said first frame to said vehicle frame member for pivotable movement of said first frame and said snowplow blade relative to said vehicle frame member about a generally horizontally extending axis,*

*a second frame member,*

*means for connecting said second frame member to said vehicle, and*

*means connecting said second frame member to said first frame for pivotable movement therebetween about said horizontally extending axis so that when said second frame member is attached to said vehicle, said first frame member is pivotable relative to said vehicle with said second frame member remaining stationary relative to said vehicle and said first frame and does not interfere with the pivotal movement of said first frame member and said snowplow blade.*

*47. A vehicle mounted snowplow blade assembly as set forth in claim 45*

*wherein said support frame, when connected to said mounting frame, includes an extension in front of and above said bumper, and*

*including an actuator connected to said support frame and said A-frame to pivot said A-frame about said pivot axis.*

*48. A vehicle mounted snowplow blade assembly as set forth in claim 45 including a headlamp connected to said support frame and removable with said A-frame and said support frame.*

*49. A vehicle mounted snowplow blade assembly as set forth in claim 45 including a support stand connected to said snowplow blade assembly and extending therefrom for ground engagement to support said snowplow blade assembly when detached from said vehicle, said support stand connected to said snowplow blade assembly for movement to store said support stand when said snowplow blade assembly is attached to said vehicle.*

*50. A vehicle mounted snowplow blade assembly as set forth in claim 49*

*wherein said support stand is connected to said A-frame, and*

*including an adjustable connection of said support stand to said A-frame to selectively vary the position of said stand relative to said A-frame to vary the horizontal position of said snowplow blade assembly.*

*51. A vehicle mounted snowplow blade assembly as set forth in claim 45 wherein the snowplow blade assembly includes a support stand for supporting the A-frame in a generally horizontal position and, when the A-frame is not connected to the mounting frame, for selectively adjusting the vertical position of the snowplow blade assembly.*

*52. A vehicle mounted snowplow blade assembly as set forth in claim 46*

*wherein said second frame member includes an extension in front of and above said bumper, and*

*including an actuator connected to said second frame member and said first frame member to pivot said first frame member about said horizontally extending axis.*

*53. A vehicle mounted snowplow blade assembly as set forth in claim 46 including a headlamp connected to said second frame member and removable with said first frame member and second frame member.*

*54. A vehicle mounted snowplow blade assembly as set forth in claim 46 including a support stand connected to said snowplow blade assembly and extending therefrom for ground engagement to support said snowplow blade assembly when detached from the vehicle, said support stand connected to said snowplow blade assembly for movement to store said support stand when said snowplow blade assembly is attached to the vehicle.*

*55. A vehicle mounted snowplow blade assembly as set forth in claim 54*

*wherein said support stand is connected to said first frame member, and*

*including an adjustable connection of said support stand to said first frame member to selectively vary the position of said stand relative to said first frame member to vary the horizontal position of said snowplow blade assembly.*

*56. A vehicle mounted snowplow blade assembly as set forth in claim 46 wherein the snowplow blade assembly includes a support stand for supporting the first frame member in a generally horizontal position and, when the first frame member is not connected to the mounting means, for selectively adjusting the vertical position of the snowplow blade assembly.*

* * * * *

US00RE35700C1

(12) EX PARTE REEXAMINATION CERTIFICATE (10379th)

United States Patent
Watson et al.

(10) Number: US RE35,700 C1
(45) Certificate Issued: Nov. 3, 2014

(54) REMOVABLE SNOWPLOW ASSEMBLY WITH PIVOTABLE LIFT STAND

(75) Inventors: Gary E. Watson, Mequon, WI (US); James R. Doornek, Mequon, WI (US); Thomas P. Fechter, Jackson, WI (US)

(73) Assignee: Curtis Industries, LLC, Worcester, MA (US)

Reexamination Request:
No. 90/013,073, Dec. 3, 2013

Reexamination Certificate for:

| | |
|---|---|
| Patent No.: | **Re. 35,700** |
| Issued: | **Dec. 30, 1997** |
| Appl. No.: | **08/566,277** |
| Filed: | **Dec. 1, 1995** |

Related U.S. Patent Documents

Reissue of:

| | |
|---|---|
| (64) Patent No.: | **5,125,174** |
| Issued: | **Jun. 30, 1992** |
| Appl. No.: | **07/686,123** |
| Filed: | **Apr. 15, 1991** |

Related U.S. Application Data

(63) Continuation of application No. 08/268,195, filed on Jun. 29, 1994, now abandoned, which is an application for the reissue of Pat. No. 5,125,174.

(51) Int. Cl.
*E01H 5/04* (2006.01)
*E01H 5/06* (2006.01)

(52) U.S. Cl.
USPC ..... 37/231; 37/235; 37/270

(58) Field of Classification Search
USPC ..... 37/231, 235, 270
See application file for complete search history.

(56) References Cited

To view the complete listing of prior art documents cited during the proceeding for Reexamination Control Number 90/013,073, please refer to the USPTO's public Patent Application Information Retrieval (PAIR) system under the Display References tab.

*Primary Examiner* — Matthew C. Graham

(57) ABSTRACT

A detachable snowplow blade lift assembly including a mounting frame permanently connected to the vehicle frame A snowplow assembly including an A-frame and a snowplow blade mounted on the A-frame is pivotally connected to the mounting frame. A lift frame assembly including a lift actuator mechanism for raising and lowering the A-frame and snowplow blade is pivotally connected to the A-frame for rotation about a pivot axis. The snowplow blade lift assembly also includes a mounting arrangement for releasably connecting the A-frame and lift frame as a unit to the vehicle for pivotable movement of the A-frame relative to the vehicle and to the lift frame about the pivot axis. The A-frame mount affording pivotal movement of the A-frame and the lift frame about a common pivot axis provides a snowplow blade lift assembly which can be attached to, and detached from, the mounting flame as a unit and which has the capacity to stack snow.

**Attention is directed to the decision of *Douglas Dynamics, Lic* v. *Buyers Products Company*, US District Court Civil Docket - Western Wisconsin 3:09cv261 relating to this patent. This reexamination may not have resolved all questions raised by this decision. See 37 CFR 1.552(c) for *ex parte* reexamination and 37 CFR 1.906(c) for *inter partes* reexamination.**

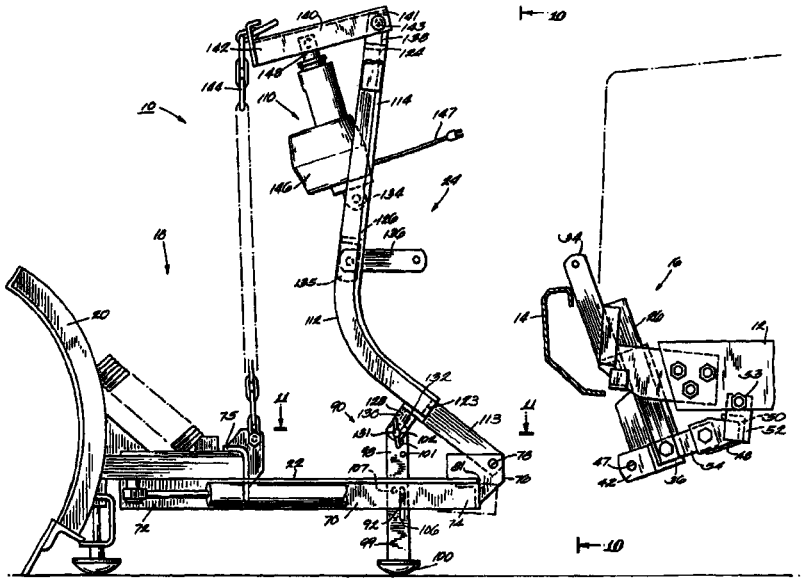

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 45, 47, 48, 49 and 51 is confirmed.

Claims 1-44, 46, 50 and 52-56 were not reexamined.

* * * * *